US012583528B2

(12) United States Patent
Kwon et al.

(10) Patent No.: US 12,583,528 B2
(45) Date of Patent: Mar. 24, 2026

(54) MOVING OBJECT CABIN AND MOVING OBJECT INCLUDING THE SAME

(71) Applicants: Hyundai Motor Company, Seoul (KR); Kia Corporation, Seoul (KR)

(72) Inventors: Seok Ryung Kwon, Seoul (KR); Jea Kyoo An, Seoul (KR); Joo Young Chun, Seoul (KR); Hun Keon Ko, Anyang-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 510 days.

(21) Appl. No.: 18/312,308

(22) Filed: May 4, 2023

(65) Prior Publication Data

US 2024/0158018 A1    May 16, 2024

(30) Foreign Application Priority Data

Nov. 15, 2022    (KR) .......................... 1020220152868

(51) Int. Cl.
B62D 25/10        (2006.01)
(52) U.S. Cl.
CPC .................................... B62D 25/10 (2013.01)
(58) Field of Classification Search
CPC ........ B62D 25/10; B62D 33/04; B62D 63/02; B62D 63/04; B60P 9/00; B64D 9/00; E05F 15/655; B25J 5/007; B25J 11/008; E05Y 2201/628; E05Y 2201/684; E05Y 2201/686
See application file for complete search history.

(56) References Cited

U.S. PATENT DOCUMENTS

| | | | | |
|---|---|---|---|---|
| 4,341,165 A | * | 7/1982 | Calandritti .............. | E05G 5/003 109/8 |
| 5,505,280 A | * | 4/1996 | Salmon ................... | B66B 13/08 187/334 |
| 5,987,817 A | * | 11/1999 | Hein ....................... | E06B 3/906 49/40 |
| 6,032,762 A | * | 3/2000 | O'Donnell ............ | E05F 17/004 187/316 |
| 9,440,519 B2 | * | 9/2016 | Choi ...................... | E05D 15/101 |
| 10,946,912 B1 | * | 3/2021 | Hostein ................... | G05D 1/02 |
| 11,492,834 B2 | * | 11/2022 | Principe ................. | E05D 3/14 |
| 11,536,076 B2 | * | 12/2022 | Yang ....................... | B60L 53/14 |
| 2016/0083071 A1 | | 3/2016 | Pichlmaier et al. | |
| 2020/0270924 A1 | * | 8/2020 | Principe ................ | E05F 15/611 |
| 2021/0381297 A1 | * | 12/2021 | Yang ..................... | E05F 15/646 |

FOREIGN PATENT DOCUMENTS

| | | | | | |
|---|---|---|---|---|---|
| CN | 105442975 | | 4/2017 | | |
| CN | 208380379 | U * | 1/2019 | | |
| CN | 110284781 | A * | 9/2019 | ............. | E05B 81/10 |
| CN | 113246756 | A * | 8/2021 | ............. | E05D 15/20 |

(Continued)

*Primary Examiner* — James A Shriver, II
*Assistant Examiner* — Ian Bryce Shelton
(74) *Attorney, Agent, or Firm* — Fish & Richardson P.C.

(57)        ABSTRACT

A moving object cabin includes a body having an opening open in a predetermined first direction and defining an internal space communicating with the opening, a cover provided to open or close the opening, and a cover moving part disposed in the internal space of the body and coupled to the cover to move the cover.

18 Claims, 12 Drawing Sheets

(56)        References Cited

FOREIGN PATENT DOCUMENTS

| CN | 114370208 | A | * | 4/2022 | ........... E05D 15/101 |
|----|-----------|---|---|--------|-------------------------|
| CN | 114654975 | A | * | 6/2022 | ........... E05F 17/004 |
| CN | 114655334 | A | * | 6/2022 | ........... B60G 17/00 |
| CN | 114687636 | A | * | 7/2022 | ........... E05F 17/004 |
| KR | 10-2021-0150740 | | | 12/2021 | |
| WO | WO-0007922 | A1 | * | 2/2000 | ........... E05F 15/635 |
| WO | WO 2020/176509 | | | 9/2020 | |
| WO | WO-2022013202 | A1 | * | 1/2022 | ........... E05D 15/101 |

* cited by examiner

MOVING OBJECT CABIN AND MOVING OBJECT INCLUDING THE SAME

CROSS-REFERENCE TO RELATED APPLICATION

This application claims the benefit of priority to Korean Patent Application No. 10-2022-0152868, filed in the Korean Intellectual Property Office, on Nov. 15, 2022, the entire contents of which are incorporated herein by reference.

TECHNICAL FIELD

The present disclosure relates to a moving object cabin and a moving object including the same.

BACKGROUND

Various types of moving objects may replace manpower. For example, with growth of a delivery industry, moving objects may deliver food or goods in an unmanned manner.

These moving objects are formed by coupling a cabin that may store food or goods therein and a moving part that is coupled to the cabin and moves the cabin. Among them, some cabins use a method of opening or closing an opening through a manner in which a cover provided to close the opening through which food or goods are input or output rotates about an axis.

As an example, a cabin having a cylindrical body may be considered. In this case, the cover may have a shape of a portion of an outer circumferential surface of a cylinder. In this case, the cover and the body have a predetermined step so that the cover may smoothly open or close the opening. In this case, foreign substances introduced through the step interferes with operation of the cover or remains in an internal space.

As another example, a cabin in which a cover performs a linear movement and a rotational movement to remove the step may be considered. In this case, since a plurality of devices for operating the cover should be provided, the weight of the moving object increases, and the unit cost of the moving object increases.

SUMMARY

The present disclosure has been made to solve the above-mentioned problems occurring in the prior art while advantages achieved by the prior art are maintained intact.

An aspect of the present disclosure provides a moving object cabin which may remove a step between a cover and a body using one operation member, and a moving object including the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a moving object cabin includes a body having an opening open in a predetermined first direction and defining an internal space communicating with the opening, a cover provided to open or close the opening, and a cover moving part disposed in the internal space of the body and coupled to the cover to move the cover, wherein the cover moving part is provided to perform, when a closed state in which the cover closes the opening is switched to an open state in which the cover opens the opening, a first operation in which the cover moves to the internal space in a second direction opposite to the first direction, and a second operation in which the cover rotationally moves in a third direction that is a direction in which the cover rotates about an imaginary axis spaced apart from the cover in the second direction after the first operation, and when the open state is switched to the closed state, a third operation in which the cover rotationally moves in a fourth direction opposite to the third direction, and a fourth operation in which the cover moves in the first direction after the third operation.

According to another example, the cover moving part may further include a forward/rearward moving member that guides the cover such that the cover moves in the first direction and the second direction; and a rotational movement member that guides the cover such that the cover rotationally moves in the third direction and the fourth direction.

According to still another example, the forward/rearward moving member may include a first forward/rearward moving portion coupled to a side of the cover in the second direction, a second forward/rearward moving portion protruding from the first forward/rearward moving portion in a fifth direction that is an extension direction of the axis, and a third forward/rearward moving portion including a guide hole having a shape extending in the second direction on the basis of the closed state and provided such that the second forward/rearward moving portion is inserted thereinto.

According to yet another example, the cover moving part may include an operation member having a rotary shaft extending in the fifth direction and provided to rotate the rotary shaft in the third direction and the fourth direction, and a link member connecting the operation member and the forward/rearward moving member to each other.

According to yet another example, the link member may include a first link portion rotating in conjunction with the rotation of the rotary shaft, and a second link portion rotatably coupled to an end of the first link portion and rotatably coupled to the second forward/rearward moving portion.

According to yet another example, a length of the first link portion may be greater than a length of the second link portion.

According to yet another example, the cover moving part may further include a rail member which protrudes from the body and extends in the third direction and on which the rotational movement member is seated.

According to yet another example, the body may include a covering member disposed in the internal space, disposed on a side of the cover moving part in the fifth direction, and covering the cover moving part when viewed from the fifth direction.

According to yet another example, the cabin may further include a support member protruding in the fifth direction from a side surface of the body in a direction opposite to the fifth direction and supporting the covering member, wherein a length of the support member in the fifth direction is greater than a length of the cover moving part in the fifth direction.

According to yet another example, when an outer radius of an imaginary circle having a shape corresponding to the rail member is referred to as an outer radius, the first forward/rearward moving portion may be disposed on the outer radius of the rail member.

According to yet another example, the third forward/rearward moving portion may be coupled to the rotational movement member, and the guide hole and the rail member partially overlap each other when viewed from the fifth direction.

According to yet another example, the cabin may further include a camera part seated on a side of the covering member in the fifth direction and provided to photograph the internal space.

According to yet another example, in the closed state, the cover may be in contact with a portion of the body, defining the opening, to form a continuous surface.

According to yet another example, the forward/rearward moving member may further include an insertion portion coupled to a side of the first forward/rearward moving portion in a direction opposite to the fifth direction, and the insertion portion may be disposed in a guide groove defined by a guide part protruding in the fifth direction from a side surface of the body in a direction opposite to the fifth direction.

According to yet another example, the guide groove may include a forward/rearward guide area extending in the second direction, and a rotation guide area extending in the third direction from an end of the forward/rearward guide area 161 in the second direction.

According to yet another example, the cover moving part may further include a rail member which protrudes from the body and extends in the third direction and on which the rotational movement member is seated, and when an outer radius of an imaginary circle having a shape corresponding to the rail member is referred to as an outer radius, the guide part is disposed on the outer radius of the rail member.

According to yet another example, the insertion portion may include a bearing provided to rotate about a bearing shaft extending in the fifth direction and being in contact with the guide part.

According to another aspect of the present disclosure, a moving object includes a cabin including a body having an opening open in a predetermined first direction and defining an internal space communicating with the opening, a cover provided to open or close the opening, and a cover moving part disposed in the internal space of the body and coupled to the cover to move the cover, and a moving part coupled to the cabin and provided to move the cabin, wherein the cover moving part performs a second operation in which the cover rotates after a first operation in which, when the closed state in which the cover closes the opening is switched to the open state in which the cover opens the opening, the cover is retracted toward the internal space, and a fourth operation in which the cover moves forward after a third direction in which, when the open state is switched to the closed state, the cover rotates in a reverse direction of the second operation.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
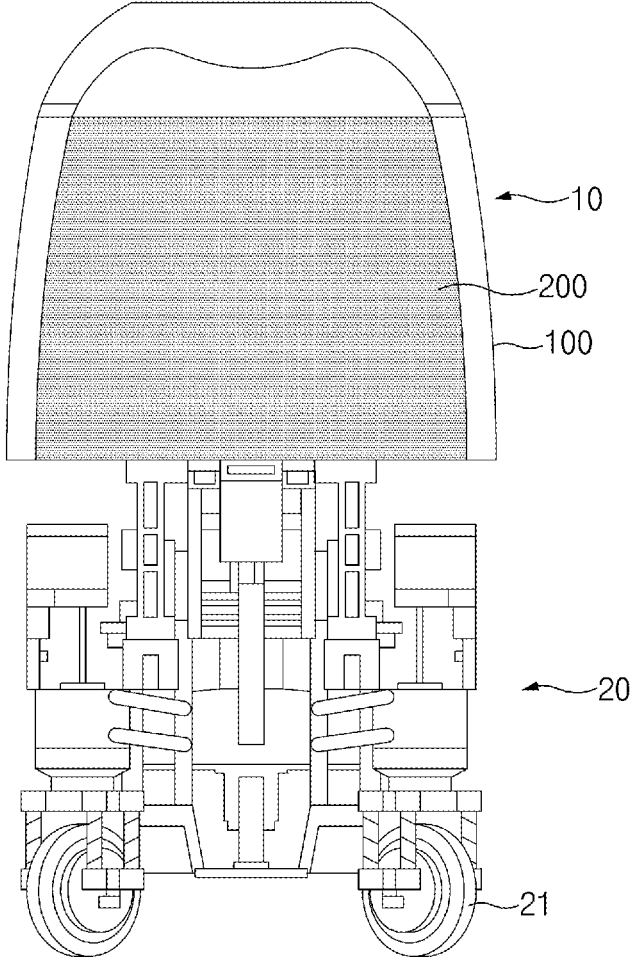
FIG. 1 is a view illustrating a moving object according to an implementation of the present disclosure.

Hereinafter, some implementations of the present disclosure will be described in detail with reference to the exemplary drawings. When components in the drawings are designated by reference numerals, the same components have the same reference numerals as far as possible even though the components are illustrated in different drawings. Further, in description of the implementations of the present disclosure, when it is determined that a detailed description of a related well-known configuration or function disturbs understanding of the implementations of the present disclosure, the detailed description will be omitted.

A cabin according to an implementation of the present disclosure may be a moving object cabin 10. The moving object cabin 10 can refer a structure which may be coupled to a moving part 20 of a moving object and in which an object may be accommodated. The moving object can refer to a structure that may move through a moving part such as a wheel and a propeller, and examples of the moving object may include a vehicle, a drone, and the like.

Figure 2:
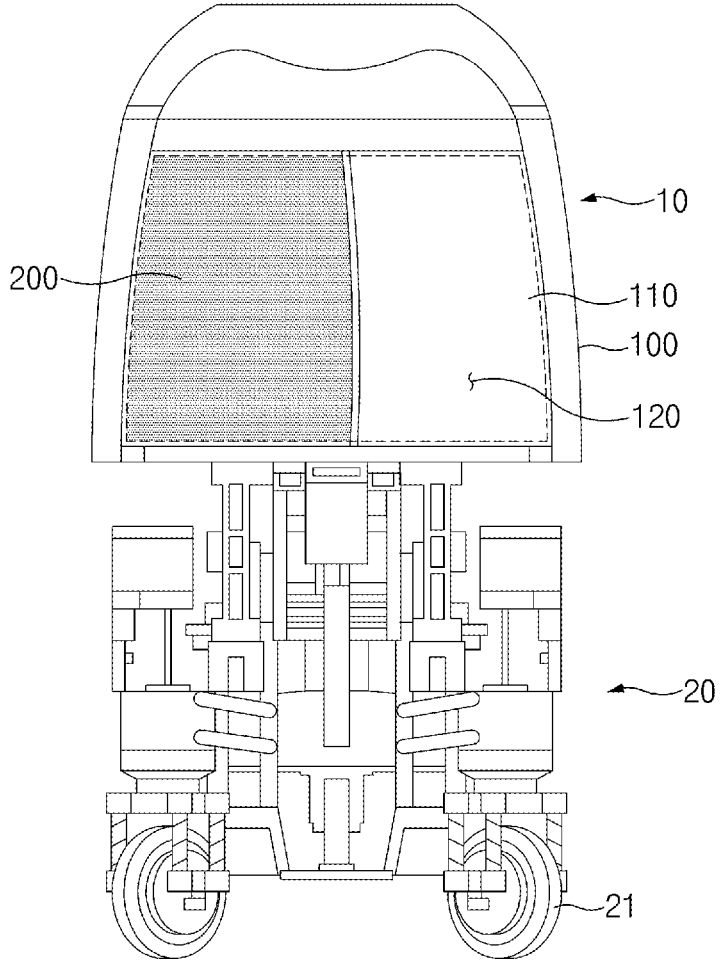
FIG. 2 is a view illustrating a situation in which a cover is open in FIG. 1.

FIG. 1 is a view illustrating a moving object according to an implementation of the present disclosure. FIG. 2 is a view illustrating a situation in which the cover is open in FIG. 1.

As illustrated in FIG. 1, the moving object according to an implementation of the present disclosure may include the cabin 10 and the moving part 20. The moving part 20 may be coupled to the cabin 10 and provided to move the cabin 10. As an example, as illustrated in FIG. 1, the moving part 20 may include a wheel 21. However, this is merely an example, and various modifications may be made as long as the cabin 10 may move as in a state in which the cabin 10 moves through the propeller or the like such as the drone.

Figure 3:
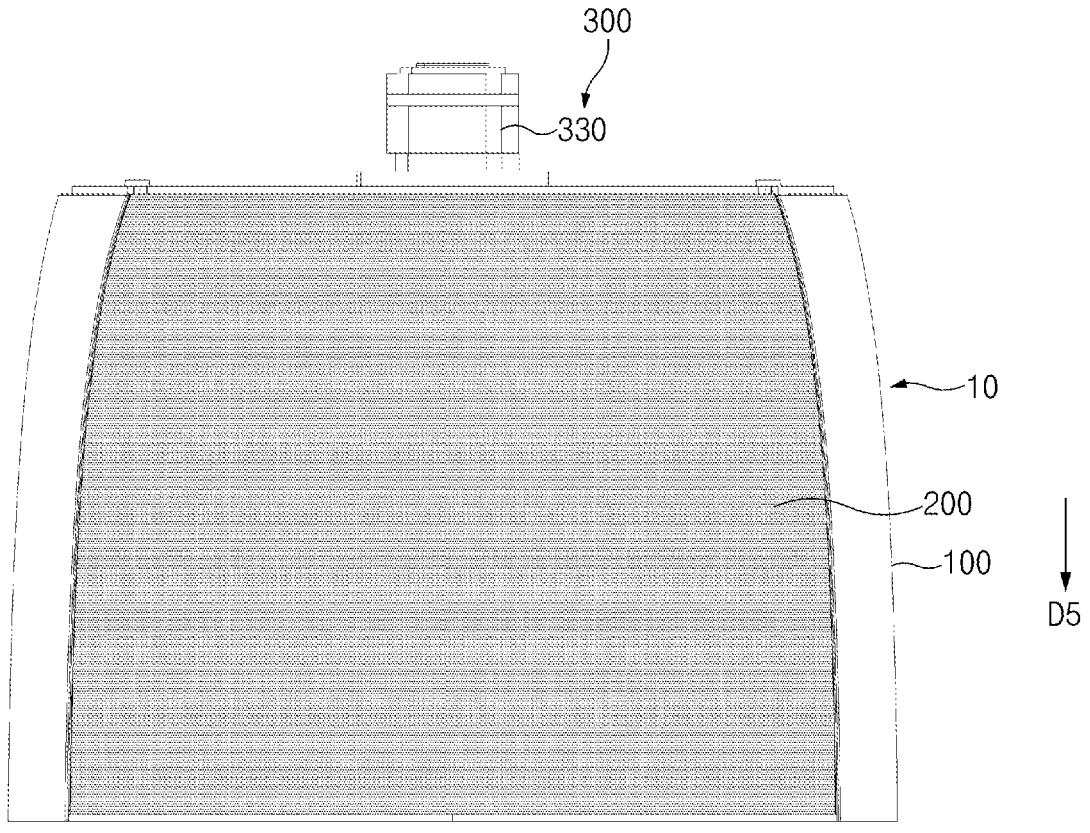
FIG. 3 is a view illustrating a moving object cabin according to an implementation of the present disclosure.
Figure 4:
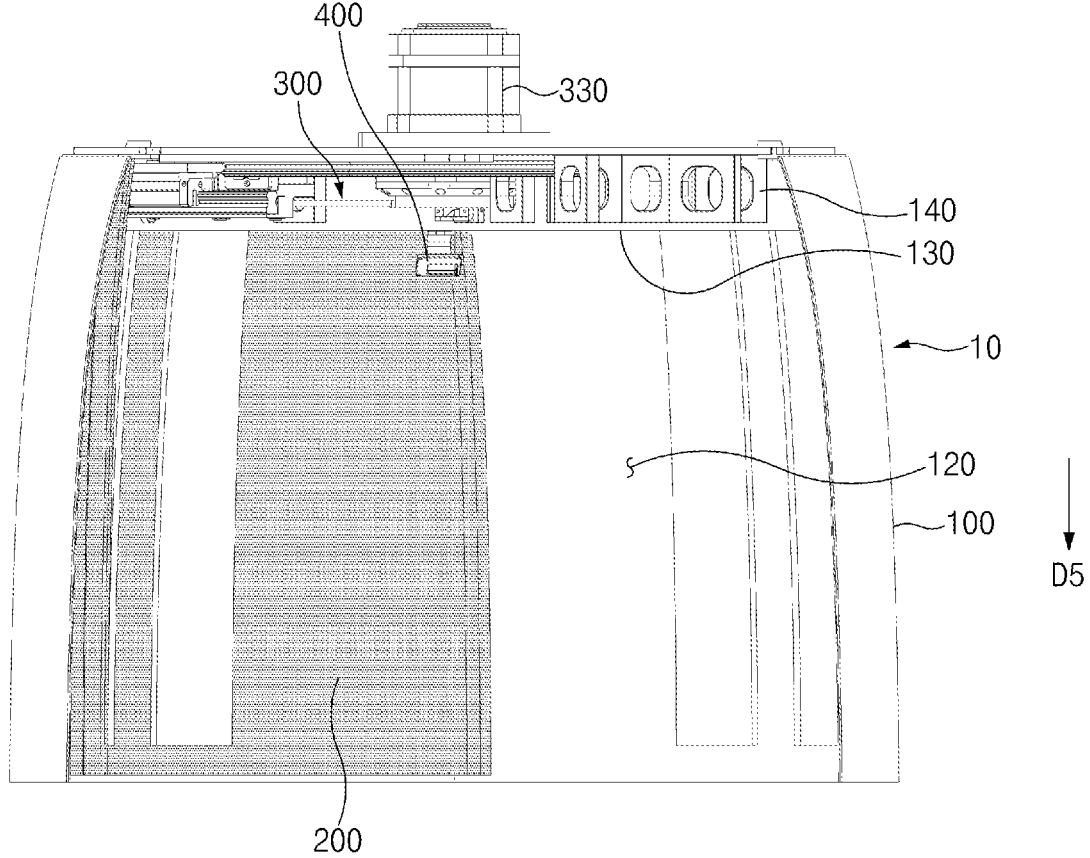
FIG. 4 is a view illustrating a situation in which the cover is open in FIG. 3.

FIG. 3 is a view illustrating a moving object cabin according to an implementation of the present disclosure. FIG. 4 is a view illustrating a situation in which the cover is open in FIG. 3. For reference, in the following drawings, for description of operation, some components such as a covering member 130 (see FIG. 5) may be omitted.

The cabin 10 may include a body 100, a cover 200, and a cover moving part 300. The body 100 may include an opening 110. The opening 110 may be open in a predetermined first direction D1. Further, the body 100 may define an internal space 120 communicating with the opening 110. A user may place an object in the internal space 120 through the opening 110. As an example, a shape of the body 100 may be formed as a portion of a cylinder, but the present disclosure is not limited thereto, and the body 100 may be modified into various shapes according to the needs of the user. The first direction D1 may be understood as a direction from the internal space 120 via the opening 110 to an outside of the body 100.

The cover 200 may be provided to open or close the opening 110. To this end, the cover 200 may have a shape corresponding to the opening 110. As an example, the cover 200 may have a curved shape that is a portion of an outer circumferential surface of a cylinder.

The cover moving part 300 may be coupled to the cover 200 and provided to move the cover 200. Hereinafter, a state in which the cover 200 closes the opening 110 is referred to as a closed state, and a state in which the cover 200 opens the opening 110 is referred to as an open state. In the closed state, the cover 200 may be in contact with a portion defining the opening 110 of the body 100 to form a continuous surface.

Hereinafter, an operation performed by the cover moving part 300 when the state of the cover 200 is switched from the closed state to the open state will be described. This may correspond to a situation in which the opening 110 is open so that an object and the like is inserted into the internal space 120.

The cover moving part 300 may perform a first operation. The first operation may be an operation in which the cover 200 moves to the internal space 120 in a second direction D2 opposite to the first direction D1. This may be understood as an operation in which the cover 200 is retracted toward the internal space 120 to rotate the cover 200.

Figure 5:
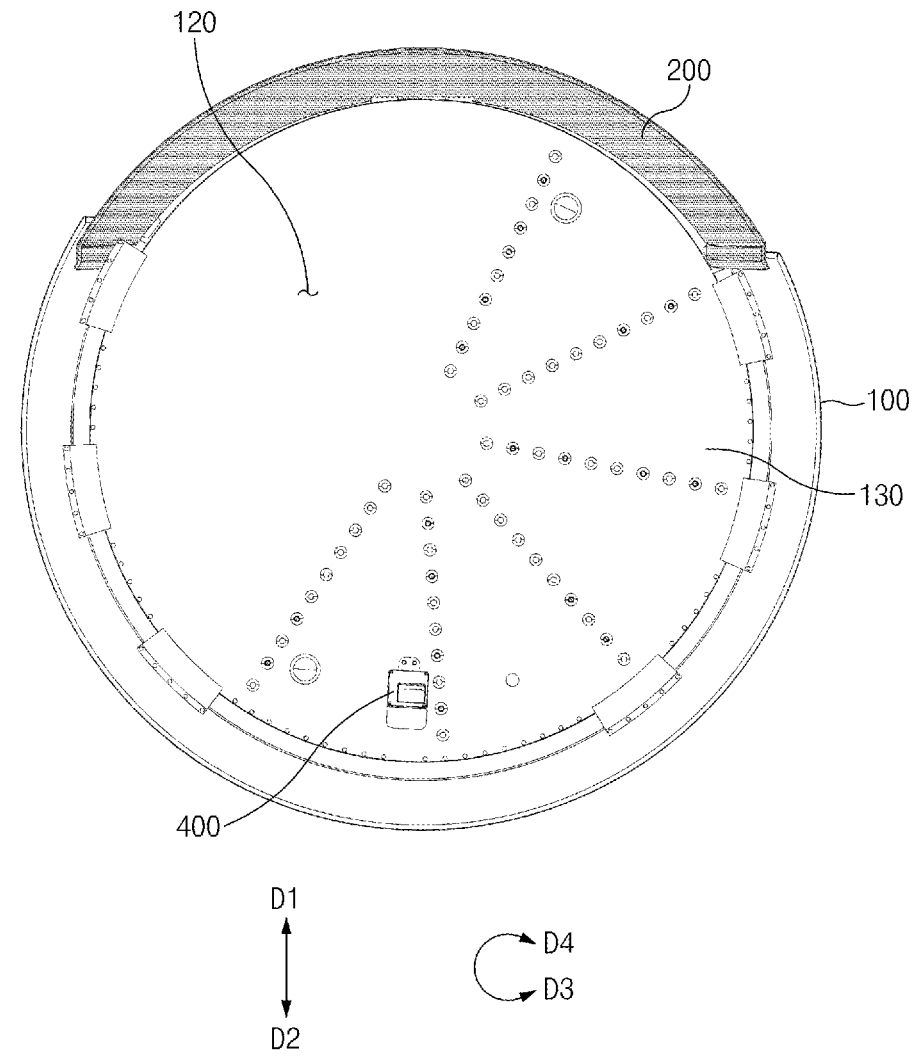
FIG. 5 is a view illustrating the moving object cabin according to an implementation of the present disclosure when viewed in a fifth direction.

The cover moving part 300 may perform a second operation. The second operation may be an operation in which the cover 200 rotates in a third direction D3 after the first operation. The third direction D3 may be a direction in which the cover 200 rotates about an imaginary axis spaced apart from the cover 200 in the second direction D2. Hereinafter, an opposite direction to the third direction D3 is referred to as a fourth direction D4, and an extension direction of the axis is referred to as a fifth direction D5. As an example, the fifth direction D5 may be a downward direction. FIG. 5 is a view illustrating the moving object cabin according to an implementation of the present disclosure when viewed in a fifth direction.

Hereinafter, an operation performed by the cover moving part 300 when the state of the cover 200 is switched from the open state to the closed state will be described. This may correspond to a situation in which the opening 110 is closed after the object is completely inserted into the internal space 120.

The cover moving part 300 may perform a third operation. The third operation may be an operation in which the cover 200 rotates in the fourth direction D4. This may be understood as a process in which the second operation is progressed in reverse.

The cover moving part 300 may perform a fourth operation. The fourth operation may be an operation in which the cover 200 moves in the first direction D1 after the third operation. This may be understood as an operation in which the cover 200 moves forward to close the opening 110.

Hereinafter, a detailed form of the cover moving part 300 will be described.

Figure 6:
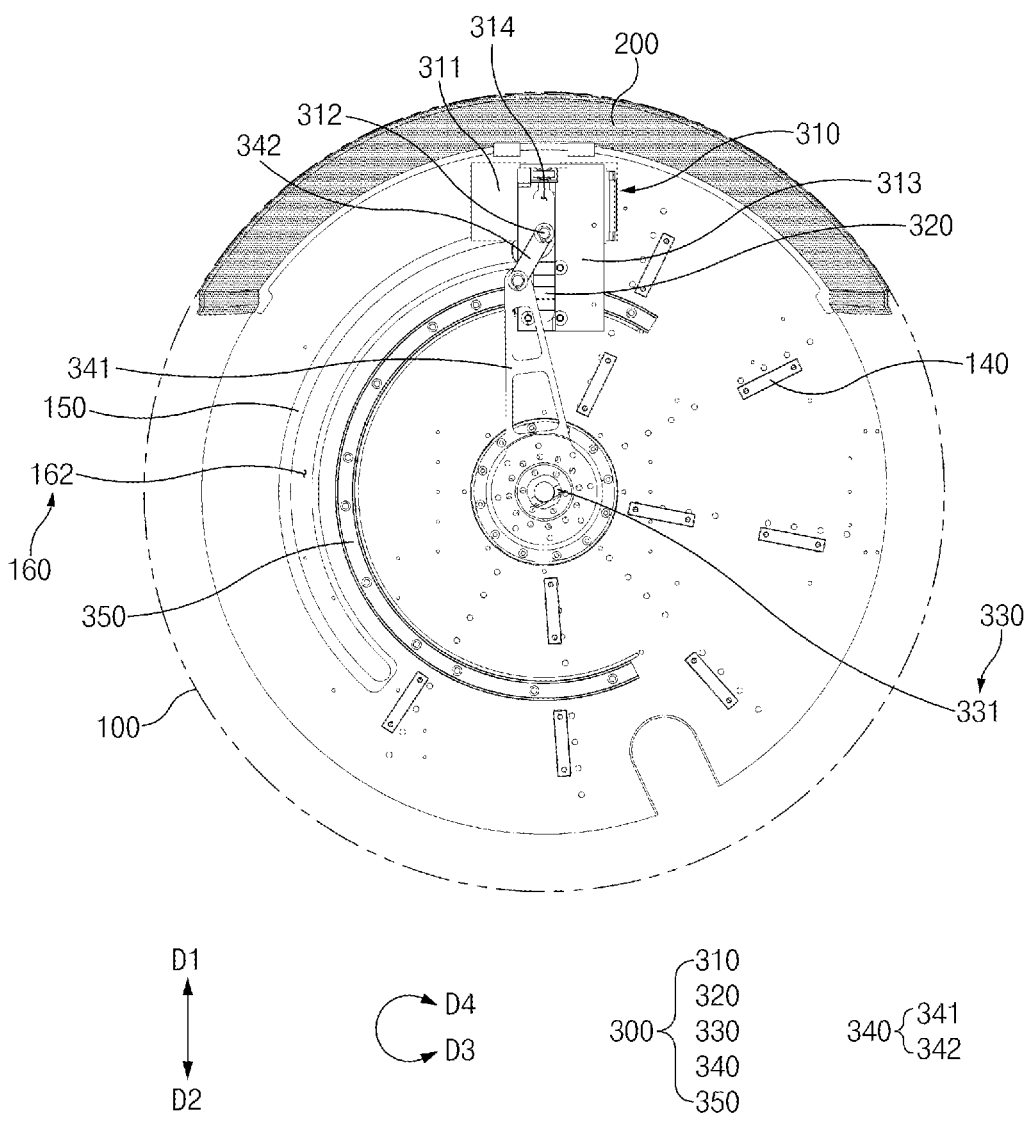
FIG. 6 is a view illustrating a cover moving part in a closed state while a covering member is omitted when viewed in the fifth direction.
Figure 7:
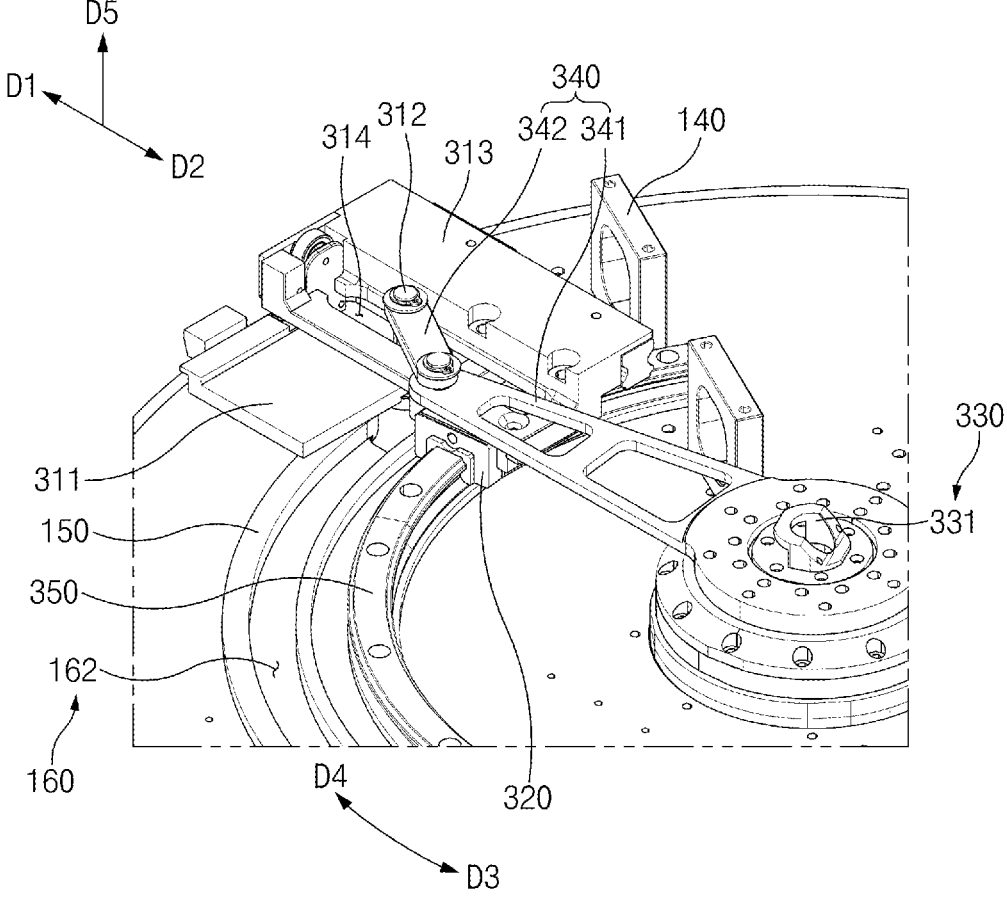
FIG. 7 is a view illustrating the cover moving part in the closed state.
Figure 8:
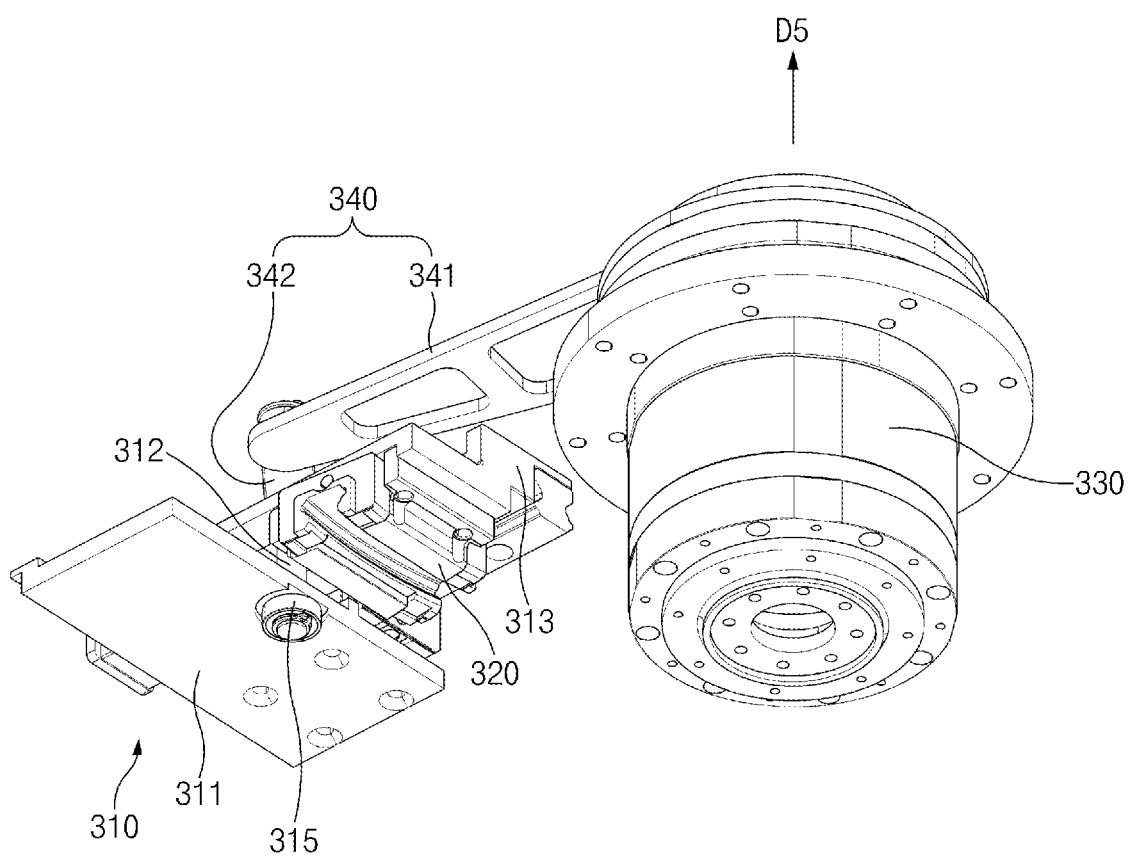
FIG. 8 is a view illustrating the cover moving part in the closed state when viewed in another direction.

FIG. 6 is a view illustrating a cover moving part in a closed state while a covering member is omitted when viewed in the fifth direction. FIG. 7 is a view illustrating the cover moving part in the closed state. FIG. 8 is a view illustrating the cover moving part in the closed state when viewed in another direction.

The cover moving part 300 may include a forward/rearward moving member 310. The forward/rearward moving member 310 may be a member that guides the cover 200 such that the cover 200 moves in the first direction D1 and the second direction D2. This can mean that the forward/rearward moving member 310 is a member related to the performance of the first operation and the fourth operation.

<Forward/Rearward Moving Member 310>

The forward/rearward moving member 310 may include a first forward/rearward moving portion 311, a second forward/rearward moving portion 312, and a third forward/rearward moving portion 314. The first forward/rearward moving portion 311 may be a portion coupled to a side of the cover 200 in the second direction D2. The second forward/rearward moving portion 312 may be a portion protruding from the first forward/rearward moving portion 311 in the fifth direction D5.

The third forward/rearward moving portion 314 may include a guide hole 313. The guide hole 313 may have a shape extending in the second direction D2 on the basis of the closed state and may be provided such that the second forward/rearward moving portion 312 is inserted thereinto. Since the second forward/rearward moving portion 312 protruding from the first forward/rearward moving portion 311 to which the cover 200 is coupled is inserted into the guide hole 313 having the shape extending in the second direction D2, the cover 200 may be guided to move in the first direction D1 and the second direction D2. The third forward/rearward moving portion 314 may be connected to a rotational movement member 320, which will be described below.

Meanwhile, the forward/rearward moving member 310 may further include an insertion portion 315. The insertion portion 315 may be coupled to a side opposite to the first forward/rearward moving portion 311 in the fifth direction D5. The insertion portion 315 may be a portion that performs guiding such that the second operation is performed after the first operation and the fourth operation may be performed after the third operation.

The insertion portion 315 may be disposed in a guide groove 160 defined by a guide part 150 protruding in the fifth direction D5 from a side surface of the body 100 in a direction opposite to the fifth direction D5. The guide groove 160 may include a forward/rearward guide area 161 extending in the second direction D2 and a rotation guide area 162 extending in the third direction D3 from an end of the forward/rearward guide area 161 in the second direction D2. This can mean that a shape of the guide groove 160 is similar to a shape of an upper portion of the question mark.

As one example, the insertion portion 315 may include a bearing. The bearing may be provided to rotate about a bearing shaft extending in the fifth direction D5 and may be in contact with the guide part 150. As the bearing is utilized, movement of the cover 200 may be more smoothly progressed. As an example, the bearing may be disposed on a side opposite to the second forward/rearward moving portion 312 in the fifth direction D5.

<Operation Member 330 and Link Member 340>

The cover moving part 300 may further include an operation member 330 and a link member 340. The operation member 330 may have a rotary shaft 331 extending in the fifth direction D5. The operation member 330 may rotate the rotary shaft 331 in the third direction D3 and the fourth direction D4. As an example, the operation member 330 may be an electric motor.

The link member 340 may connect the operation member 330 and the forward/rearward moving member 310. As an example, the link member 340 may connect the rotary shaft 331 of the operation member 330 and the second forward/rearward moving portion 312 of the forward/rearward moving member 310 to each other. As the operation member 330 and the forward/rearward moving member 310 are connected to each other, when the operation member 330 rotates the rotary shaft 331, the cover 200 may move forward or rearward by the forward/rearward moving member 310.

The link member 340 may include a first link portion 341 and a second link portion 342. The first link portion 341 may be a portion that rotates in conjunction with the rotation of the rotary shaft 331. The second link portion 342 may be rotatably coupled to an end of the first link portion 341 and rotatably coupled to the second forward/rearward moving portion 312. A length of the first link portion 341 may be greater than a length of the second link portion 342.

In summary, a form in which the operation member 330, the link member 340, and the forward/rearward moving member 310 are connected may be similar to a slider-crank structure. In this case, the first link portion 341 may serve as a crank, and the second link portion 342 may serve as a connecting rod.

Since the forward/rearward moving member 310 may move forward or rearward through the rotation of the rotary shaft 331 of the operation member 330, a structure such as a linear motor for the forward/rearward movement is not required, and thus a structure may be simplified, a weight thereof may be reduced, and costs may be reduced.

<Rotational Movement Member 320>

The cover moving part 300 may include the rotational movement member 320. The rotational movement member 320 may be a member that guides the cover 200 such that the cover 200 moves in the third direction D3 and the fourth direction D4. This can mean that the rotational movement member 320 is a member related to the performance of the second operation and the third operation.

The cover moving part 300 may further include a rail member 350. The rail member 350 may protrude from the body 100 and extend in the third direction D3. The rotational movement member 320 may be seated on the rail member 350. Here, the seating does not necessarily refer only a seated state by gravity but should be understood as a concept including a state in which components may be engaged and moved. When the rotational movement member 320 is seated on the rail member 350 and moves in the third direction D3, the second operation is performed. Further, when the rotational movement member 320 is seated on the rail member 350 and moves in the fourth direction D4, the third operation is performed.

Hereinafter, an outer radius of an imaginary circle having a shape corresponding to the rail member 350 is referred to as an outer radius. The first forward/rearward moving portion 311 may be disposed on the outer radius of the rail member 350. Further, the guide part 150 may be disposed on the outer radius of the rail member 350.

The third forward/rearward moving portion 314 may be coupled to the rotational movement member 320. This means that when the forward/rearward moving member 310 moves, the rotational movement member 320 moves together. When viewed in the fifth direction D5, the guide hole 313 and the rail member 350 may partially overlap each other.

Figure 9:
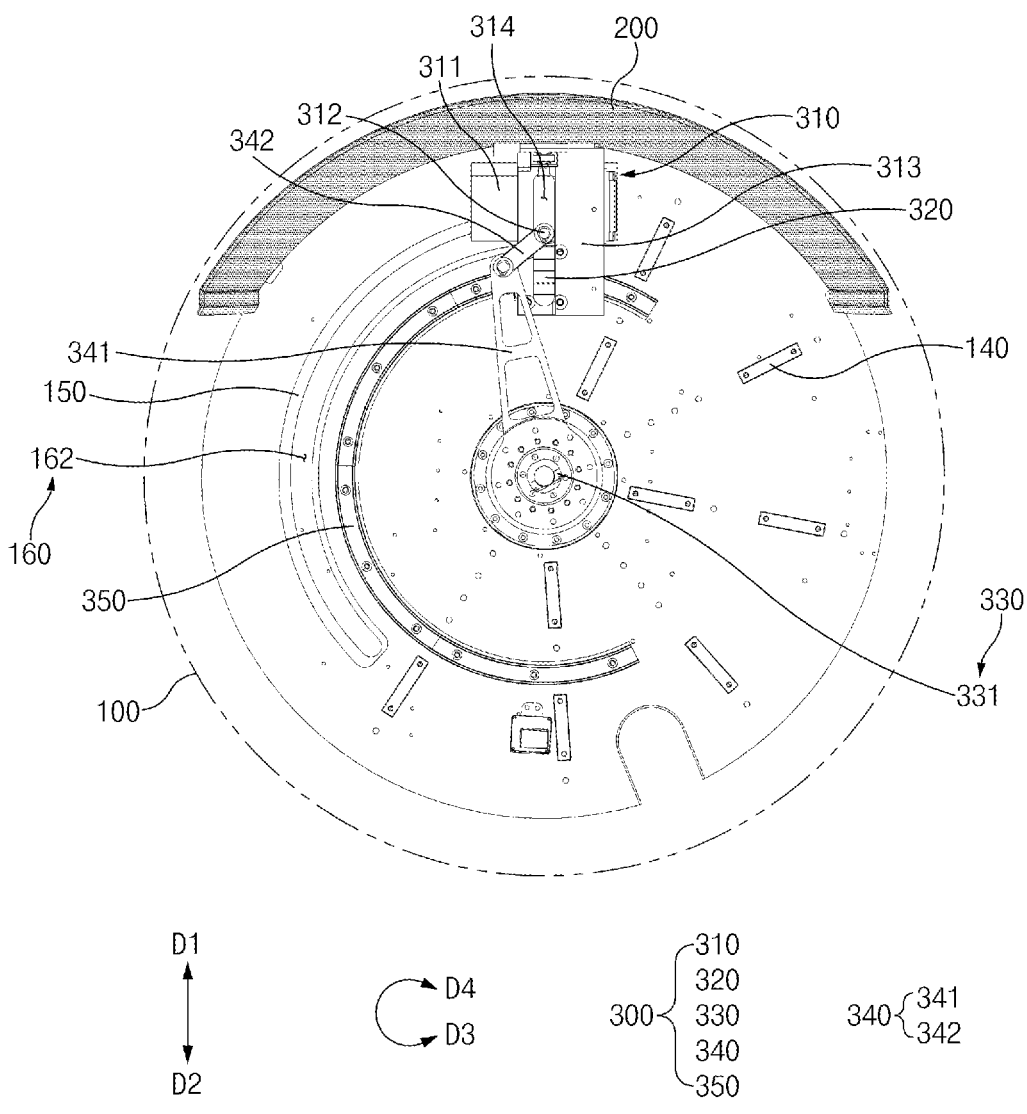
FIG. 9 is a view illustrating a state in which a first operation is performed in FIG. 6.
Figure 10:
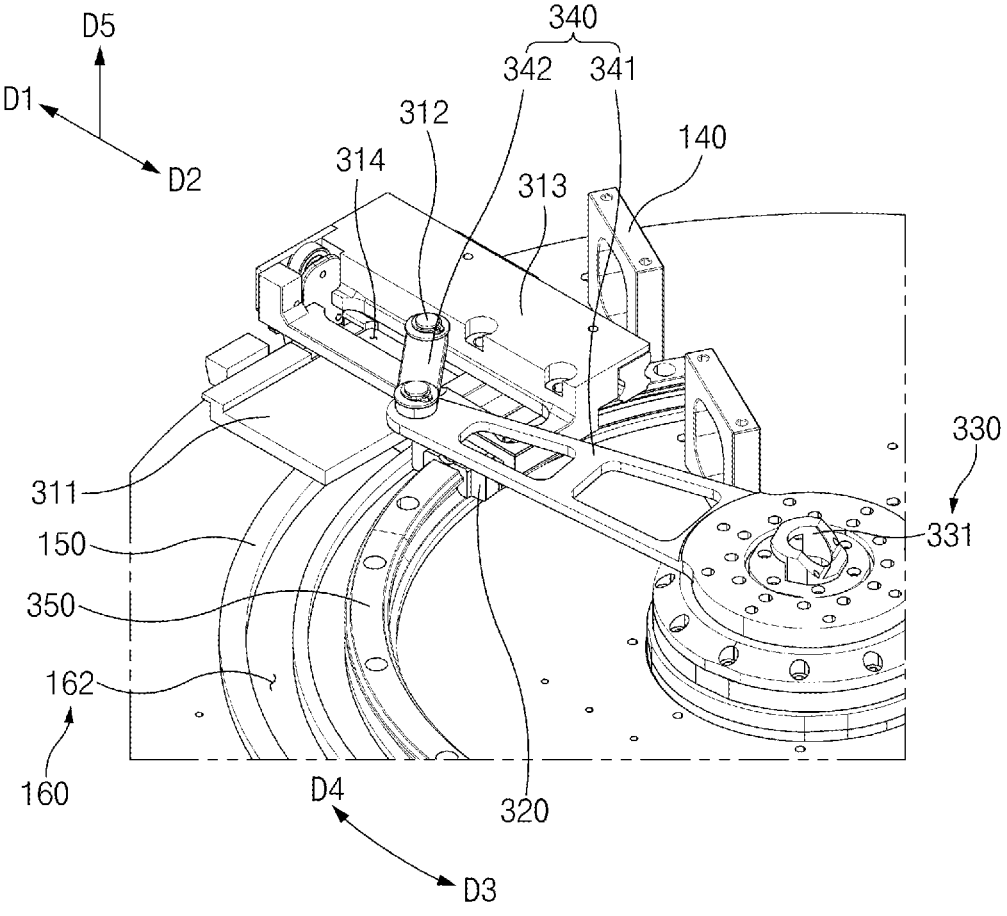
FIG. 10 is a view illustrating a state in which the first operation is performed in FIG. 7.
Figure 11:
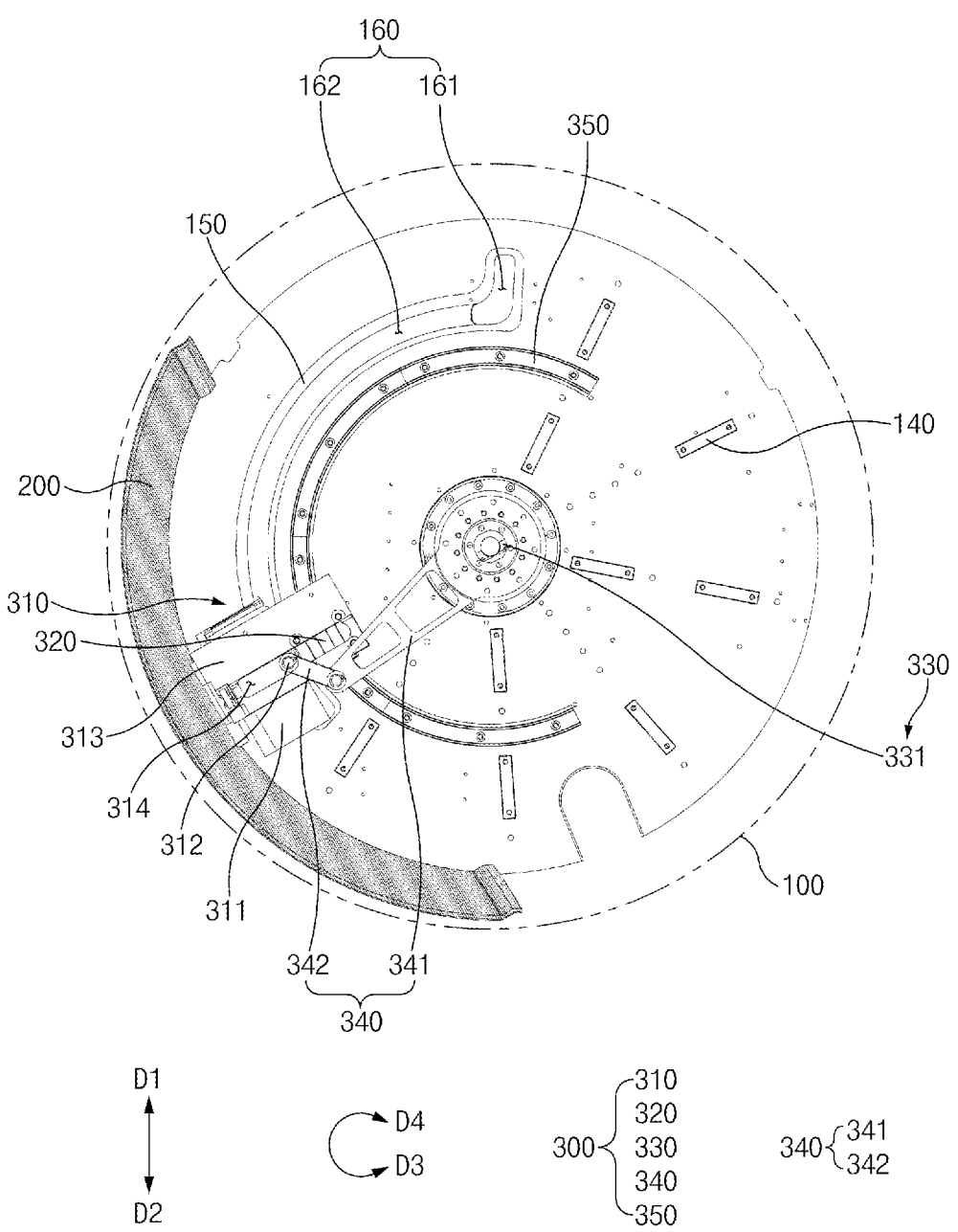
FIG. 11 is a view illustrating a state in which a second operation is performed in FIG. 9.
Figure 12:
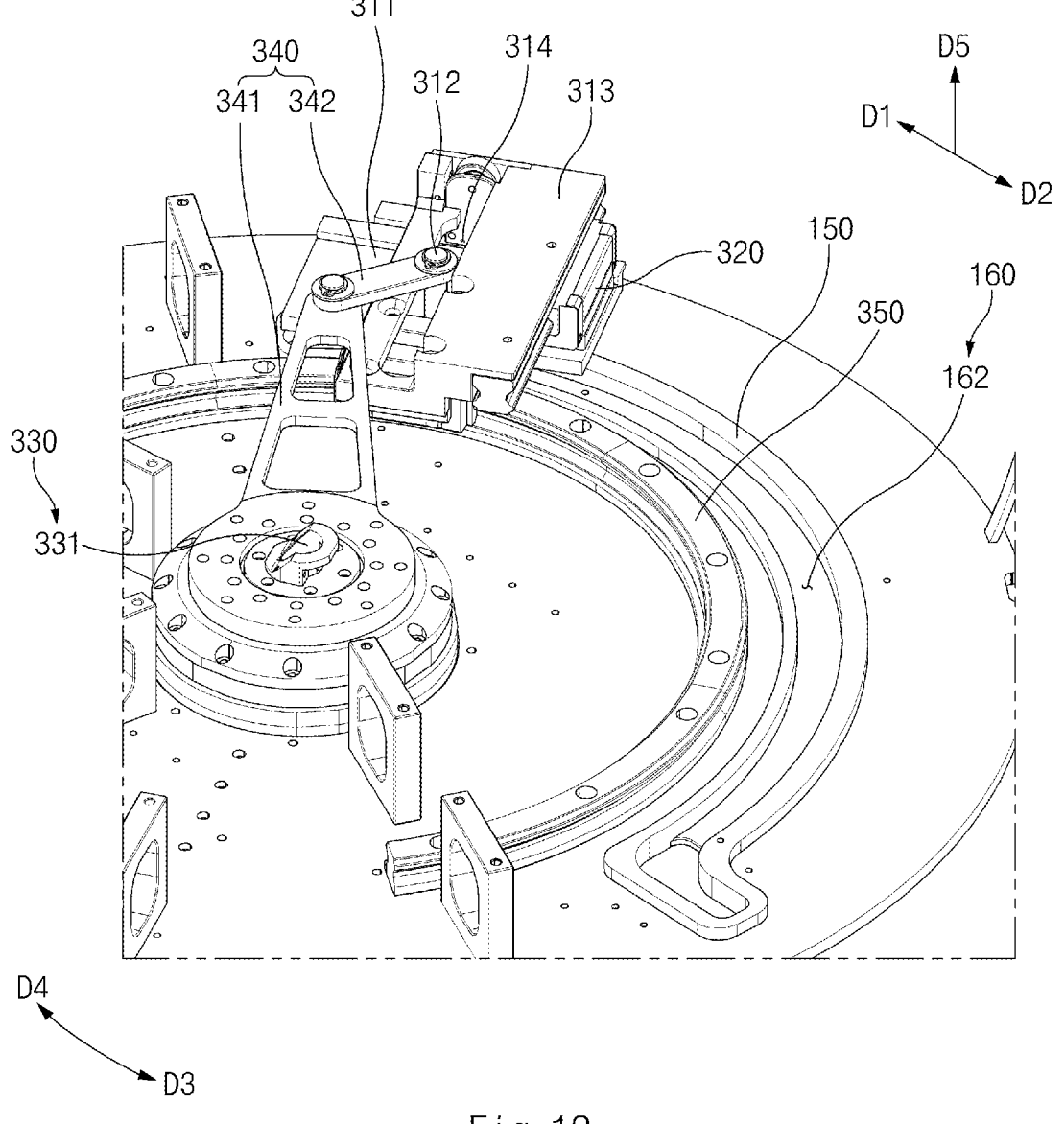
FIG. 12 is a view illustrating a state in which the second operation is performed in FIG. 10.

Hereinafter, movement of the cover 200 will be described on the basis of the above structures and the drawings. FIG. 9 is a view illustrating a state in which a first operation is performed in FIG. 6. FIG. 10 is a view illustrating a state in which the first operation is performed in FIG. 7. FIG. 11 is a view illustrating a state in which a second operation is performed in FIG. 9. FIG. 12 is a view illustrating a state in which the second operation is performed in FIG. 10.

First, the first operation will be described. This may be understood that the state of FIGS. 6 and 7 is changed to a state of FIGS. 9 and 10.

With the operation of the operation member 330, the rotary shaft 331 of the operation member 330 may rotate in the third direction D3. In the above process, the first link portion 341 rotates in the third direction D3, and the second link portion 342 may move the second forward/rearward moving portion 312 in the second direction D2 by a connection relationship between the guide hole 313 and the second forward/rearward moving portion 312. In this process, movement of the forward/rearward moving member 310 in the third direction D3 is not permitted by the insertion portion 315 and the forward/rearward guide area 161. Thus, the cover 200 moves in the second direction D2.

Meanwhile, while the cover 200 moves in the second direction D2, the insertion portion 315 escapes from the forward/rearward guide area 161 and enters the rotation guide area 162. Further, after the second link portion 342 and the guide hole 313 are arranged perpendicular to each other, the movement of the second forward/rearward moving portion 312 in the second direction D2 cannot be performed due to the first link portion 341 trying to move in the third direction D3. Thus, considering the fourth operation, when an angle between the second link portion 342 and the guide hole 313 gradually increases and then reaches a predetermined reference angle that is smaller than 90 degrees, the insertion portion 315 may be designed to escape from the forward/rearward guide area 161 and enter the rotation guide area 162.

To this end, a distance by which the insertion portion 315 moves until the insertion portion 315 escapes from the forward/rearward guide area 161 and then enters the rotation guide area 162 may correspond to a distance by which the second forward/rearward moving portion 312 moves until the angle between the second link portion 342 and the guide hole 313 reaches a predetermined reference angle.

Next, the second operation will be described. This may be understood that the state of FIGS. 9 and 10 is changed to a state of FIGS. 11 and 12.

When the above-described first operation is completed, this state may be regarded as a state in which the second operation may be performed. In this case, a rotational force in the third direction D3 is applied to the second forward/rearward moving portion 312, the insertion portion 315 enters the rotation guide area 162, and thus rotation in the third direction D3 is permitted. Thus, as the rotational force in the third direction D3 is applied to the second forward/rearward moving portion 312, the forward/rearward moving member 310 receives a force to move in the third direction D3. Since the rotational movement member 320 connected to the third forward/rearward moving portion 314 is seated on the rail member 350 extending in the third direction D3, the forward/rearward moving member 310 may rotate in the third direction D3. Thus, the cover 200 connected to the first forward/rearward moving portion 311 also moves in the third direction D3. When the second operation is completed through the process, the cover 200 is switched to the open state, and thus the user may store an object in the internal space 120.

According to the present disclosure, since both the forward/rearward movement and the rotational movement may be performed through the rotation of the rotary shaft 331 of the one operation member 330, the structure thereof may be simplified, the weight thereof may be reduced, and the costs thereof may be reduced.

It may be understood that the third operation is a reverse operation of the second operation, and the fourth operation is a reverse operation of the first operation. As described above, when the angle between the second link portion 342 and the guide hole 313 is 90 degrees after the third operation is completed, the first link portion 341 presses the second link portion 342 perpendicularly to the guide hole 313, and thus the fourth operation may not be performed smoothly. Thus, the reference angle may be smaller than 90 degrees. This can mean that the angle between the second link portion 342 and the guide hole 313 is 90 degrees or less when the third operation is completed.

Hereinafter, components that may be further provided in the cabin 10 will be described in detail.

<Covering Member 130 and Support Member 140>

The body 100 may include the covering member 130 (see FIG. 5). The covering member 130 may be disposed in the internal space 120 and disposed on a side of the cover moving part 300 in the fifth direction D5. The covering member 130 may cover the cover moving part 300 when viewed from the fifth direction D5. In other words, it may be understood that the cover moving part 300 is disposed in a space between a side surface of the body 100 in a direction opposite to the fifth direction D5 and the covering member 130.

The cabin 10 may further include a support member 140 (see FIG. 7). The support member 140 may be a member that protrudes in the fifth direction D5 from a side surface of the body 100 in a direction opposite to the fifth direction D5 and supports the covering member 130. A length of the support member 140 in the fifth direction D5 may be greater than a length of the cover moving part 300 in the fifth direction D5.

<Camera Part 400>

The cabin 10 may further include a camera part 400 (see FIG. 5). The camera part 400 may be coupled to a side of the covering member 130 in the fifth direction D5 and provided to photograph the internal space 120. Therefore, the object disposed in the internal space 120 may be photographed.

According to the present disclosure, since a linear movement and a rotational movement of a cover may be performed through one operation member, even while a step between the cover and a body may be removed, a weight of a moving object may be reduced, and manufacturing costs may be reduced.

The above description is merely illustrative of the technical spirit of the present disclosure, and those skilled in the art to which the present disclosure belongs may make various modifications and changes without departing from the essential features of the present disclosure. Thus, the implementations disclosed in the present disclosure are not intended to limit the technology spirit of the present disclosure, but are intended to describe the present disclosure, and the scope of the technical spirit of the present disclosure is not limited by these implementations. The scope of protection of the present disclosure should be interpreted by the appended claims, and all technical spirits within the scope equivalent thereto should be interpreted as being included in the scope of the present disclosure.

What is claimed is:

1. A moving object cabin comprising:
   a body that defines an opening in a first direction and an internal space that is in communication with the opening;

a cover configured to open and close at least a portion of the opening; and
   a cover moving part disposed in the internal space of the body and coupled to the cover, the cover moving part being configured to move the cover between (i) a closed state in which the cover closes the opening and (ii) an open state in which the cover opens the opening, wherein the cover moving part is configured to:
      perform a first operation and a second operation after the first operation to thereby switch the cover from the closed state to the open state, and
      perform a third operation and a fourth operation after the third operation to thereby switch the cover from the open state to the closed state, and
   wherein the cover moving part is configured to:
      in the first operation, move the cover toward the internal space in a second direction opposite to the first direction,
      in the second operation, rotate the cover in a third direction about an axis, the axis being spaced apart from the cover in the second direction,
      in the third operation, rotate the cover in a fourth direction opposite to the third direction, and
      in the fourth operation, move the cover in the first direction.

2. The moving object cabin of claim 1, wherein the cover moving part comprises:
   a forward/rearward moving member configured to guide the cover to move in the first direction and the second direction; and
   a rotational movement member configured to guide the cover such to rotate in the third direction and the fourth direction.

3. The moving object cabin of claim 2, wherein the forward/rearward moving member comprises:
   a first forward/rearward moving portion coupled to a side of the cover oriented in the second direction;
   a second forward/rearward moving portion that protrudes from the first forward/rearward moving portion in a fifth direction corresponding to an extension direction of the axis; and
   a third forward/rearward moving portion that defines a guide hole extending in the second direction, the guide hole being configured to receive the second forward/rearward moving portion.

4. The moving object cabin of claim 3, wherein the cover moving part further comprises:
   an operation member comprising a rotary shaft that extends in the fifth direction, the operation member being configured to rotate the rotary shaft in the third direction and the fourth direction; and
   a link member that connects the operation member and the forward/rearward moving member to each other.

5. The moving object cabin of claim 4, wherein the link member comprises:
   a first link configured to rotate based on rotation of the rotary shaft; and
   a second link rotatably coupled to an end of the first link and to the second forward/rearward moving portion.

6. The moving object cabin of claim 5, wherein a length of the first link is greater than a length of the second link.

7. The moving object cabin of claim 6, wherein the cover moving part further comprises a rail that protrudes from the body and extends in the third direction and supports the rotational movement member.

8. The moving object cabin of claim 7, wherein the body comprises a covering member disposed in the internal space, the covering member being disposed on a side of the cover moving part in the fifth direction and covering the cover moving part from the fifth direction.

9. The moving object cabin of claim 8, further comprising a support member that protrudes in the fifth direction from a side surface of the body and supports the covering member,
   wherein a length of the support member in the fifth direction is greater than a length of the cover moving part in the fifth direction.

10. The moving object cabin of claim 7, wherein the rail is arranged along a circular shape having an outer radius, and
   wherein the first forward/rearward moving portion is disposed on the outer radius.

11. The moving object cabin of claim 7, wherein the third forward/rearward moving portion is coupled to the rotational movement member, and
   wherein the guide hole and the rail partially overlap with each other along the fifth direction.

12. The moving object cabin of claim 8, further comprising a camera disposed at a side of the covering member in the fifth direction, the camera being configured to photograph the internal space.

13. The moving object cabin of claim 1, wherein the cover is configured to be in contact with a portion of the body to thereby define a continuous surface that covers the opening in the closed state.

14. The moving object cabin of claim 3, wherein the forward/rearward moving member further comprises an insertion portion that is coupled to the first forward/rearward moving portion and extends in a direction opposite to the fifth direction, and
   wherein the body comprises a guide part that protrudes in the fifth direction from a side surface of the body, the guide part defining a guide groove that is recessed in the direction opposite to the fifth direction and receives the insertion portion.

15. The moving object cabin of claim 14, wherein the guide groove comprises:
   a forward/rearward guide area that extends in the second direction; and
   a rotation guide area that extends in the third direction from an end of the forward/rearward guide area.

16. The moving object cabin of claim 14, wherein the cover moving part further comprises a rail that protrudes from the body and extends in the third direction, the rail supporting the rotational movement member,
   wherein the rail is arranged along a circular shape having an outer radius, and
   wherein the guide part is disposed on the outer radius of the rail.

17. The moving object cabin of claim 14, wherein the insertion portion comprises a bearing configured to rotate about a bearing shaft, the bearing shaft extending in the fifth direction and being in contact with the guide part.

18. A moving object comprising:
   a cabin comprising:
      a body that defines an opening and an internal space in communication with the opening,
      a cover configured to open and close at least a portion of the opening, and
      a cover moving part disposed in the internal space of the body and coupled to the cover, the cover moving part being configured to move the cover between (i) a closed state in which the cover closes the opening and (ii) an open state in which the cover opens the opening; and
   a moving part coupled to the cabin and configured to move the cabin,
   wherein the cover moving part is configured to:
      perform a first operation and a second operation after the first operation to thereby switch the cover from the closed state to the open state, and
      perform a third operation and a fourth operation after the third operation to thereby switch the cover from the open state to the closed state,
   wherein the cover moving part is configured to:
      in the first operation, retract the cover toward the internal space,
      in the second operation, rotate the cover to open the opening,
      in third operation, rotate the cover in a reverse direction of the second operation, and
      in the fourth operation, move the cover forward toward the opening to close the opening.

* * * * *